G. GORTON.
STOCK CLAMPING MECHANISM FOR CUTTING OFF AND OTHER MACHINES.
APPLICATION FILED DEC. 1, 1915.

1,219,935.

Patented Mar. 20, 1917.
3 SHEETS—SHEET 2.

Witness
Allen Peck.

Inventor
George Gorton
By
Hubert E. Peck
Attorney

G. GORTON.
STOCK CLAMPING MECHANISM FOR CUTTING OFF AND OTHER MACHINES.
APPLICATION FILED DEC. 1, 1915.
1,219,935.
Patented Mar. 20, 1917.
3 SHEETS—SHEET 3.
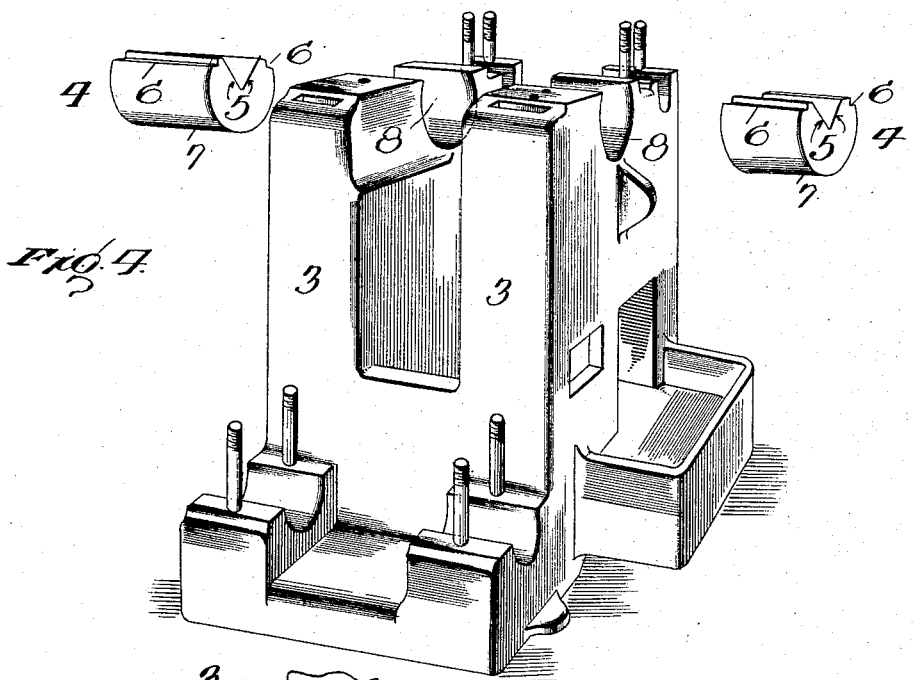
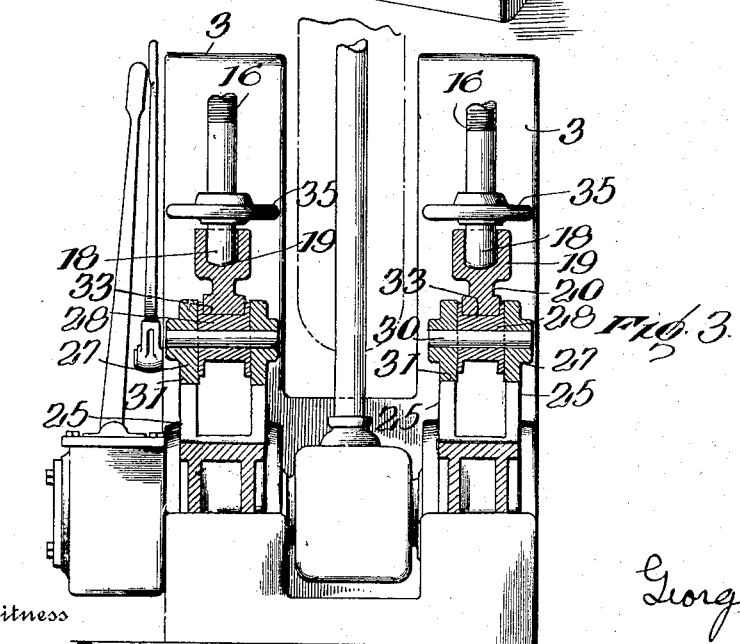
Witness
Allen Peck.
Inventor
George Gorton
By
Kuhn & Peck
Attorney

UNITED STATES PATENT OFFICE.

GEORGE GORTON, OF RACINE, WISCONSIN.

STOCK-CLAMPING MECHANISM FOR CUTTING-OFF AND OTHER MACHINES.

1,219,935.  Specification of Letters Patent.  Patented Mar. 20, 1917.

Application filed December 1, 1915. Serial No. 64,556.

*To all whom it may concern:*

Be it known that I, GEORGE GORTON, a citizen of the United States, residing at Racine, in the county of Racine and State of Wisconsin, have invented certain new and useful Improvements in and Relating to Stock-Clamping Mechanism for Cutting-Off and other Machines, of which the following is a specification.

This invention relates to certain improvements in stock clamping mechanism for cutting off and other machines; and the objects and nature of the invention will be readily understood by those skilled in the art in the light of the following explanation of the accompanying drawings illustrating what I now believe to be the preferred embodiment or mechanical expression of the invention from among other forms and arrangements within the spirit and scope of the claims.

An object of the invention is to provide a durable, and exceedingly efficient power-clamping mechanism for holding the stock in fixed position during the cutting off or other operations of machinery thereon and which can be quickly and easily applied to clamp the stock, and released to free the stock for feeding forward into the machine after each cut.

A further object of the invention is to provide certain improvements in power operating means for the stock clamping mechanisms of cutting off and other machines.

A further object of the invention is to provide certain improvements in the construction and mounting of fixed jaws of stock clamping mechanisms.

The invention consists in certain novel features in construction and in combinations and arrangements as more fully and particularly set forth and pointed out hereinafter.

Referring to the accompanying drawings:—

Fig. 3, is a vertical section on the line 3—3, Fig. 1.

Fig. 4, is a detail perspective showing the formation of the machine frame or base to receive the stationary jaws of the clamping mechanism, said jaws being shown separated from the holes or sockets provided therefor in the machine base.

Figure 1:
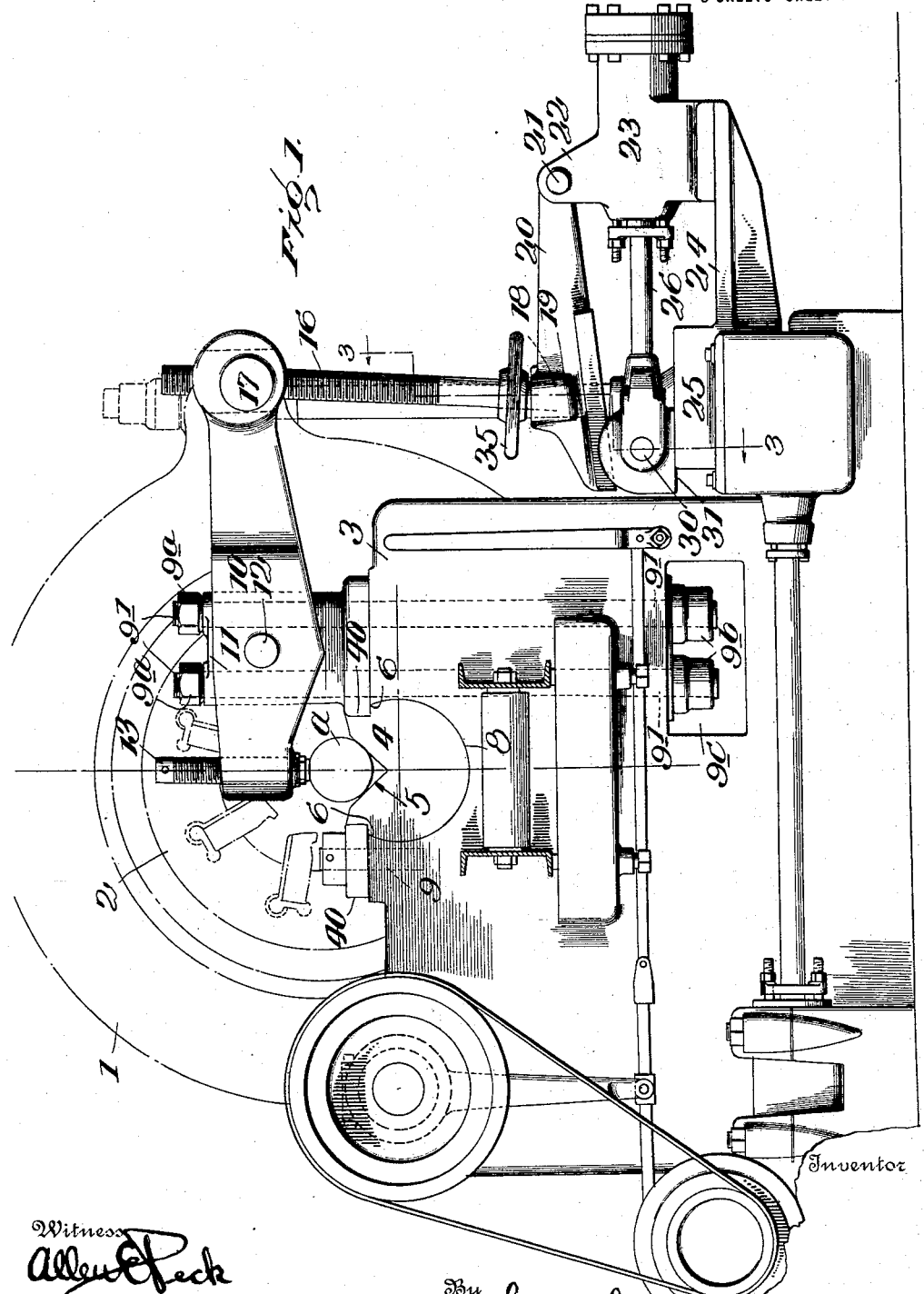
Figure 1, is a side elevation showing part of a cutting off machine provided with clamping mechanism in accordance with my invention, the cutting off head being indicated by dotted lines.
Figure 2:
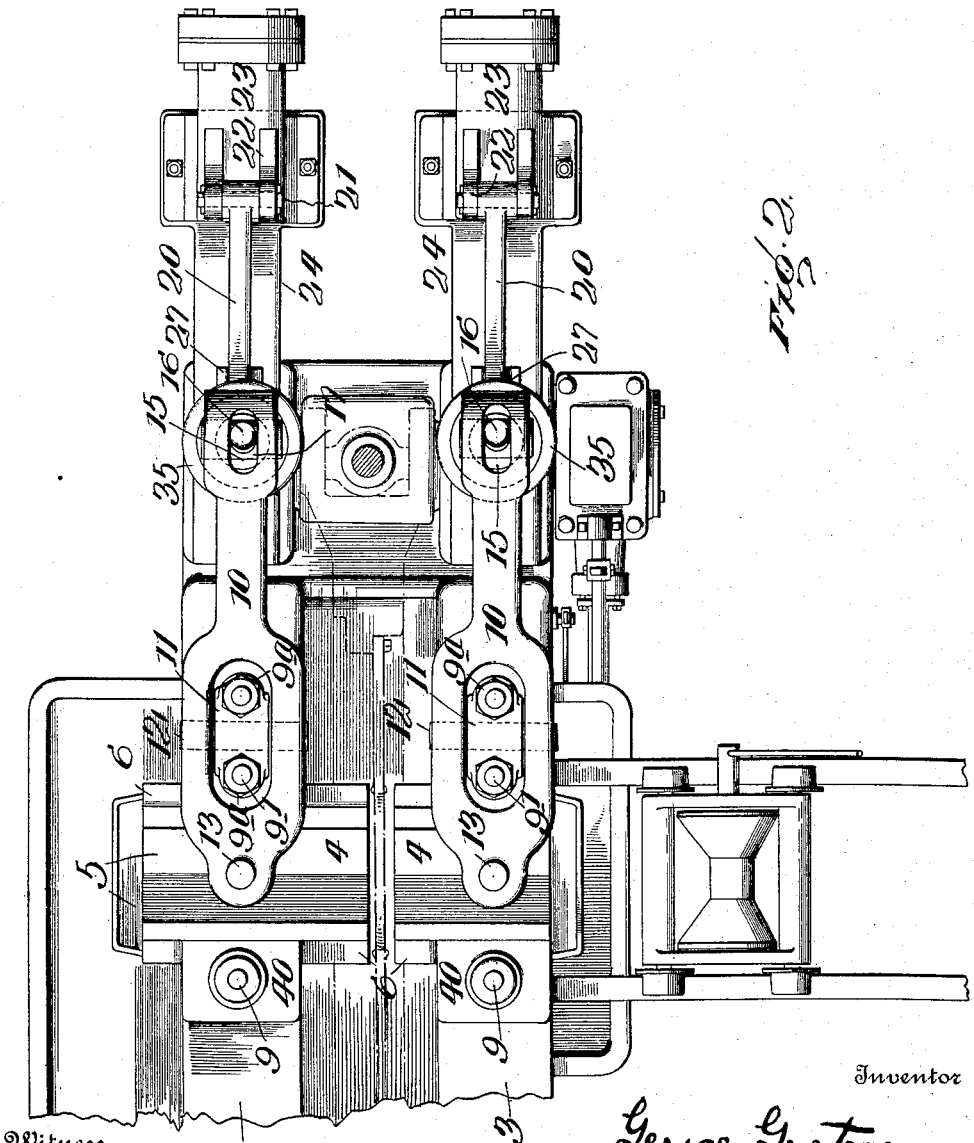
Fig. 2, is a top plan thereof, parts being broken away and the head indicated by dotted lines.

In the particular example illustrated, I show a cutting off machine provided with a vertically swingable feed carriage or head 1, carrying a rotary saw blade 2, having a central work receiving opening and cutters projecting into said opening. Suitable feed works are provided to swing the carriage or head down on its feed stroke and up on its return stroke, and driving means are also provided for rotating the gear or drum arranged in said head and carrying and rotating the saw blade. The said head is mounted on and carried by a frame or base, preferably embodying a pair of vertical side walls 3, spaced a suitable distance apart, and between which said head is vertically movable.

In operation, the stock or other work (*a*) to be severed extends through the work receiving opening of the saw blade and transversely across the walls 3, by which it is supported. In operating cutting off machines of comparatively heavy capacity, it is desirable to clamp the stock under exceedingly heavy pressure at both sides of the saw blade and as close thereto as possible so as to prevent the slightest vibration or possible movement of the stock during the cutting off operation. To this end, the top edge portions of the walls 3, are provided with two fixed or stationary stock holding troughs or jaws 4, in which the stock is centered and clamped by suitable movable clamping jaws or other members. It is desirable that these jaws be accurately alined to most accurately maintain the longitudinal axis of the stock parallel with the axis of rotation of the saw blade. Each jaw consists of a longitudinally elongated heavy or strong block or bar of suitable metal at its upper side formed with a longitudinal V groove or trough open at the top and ends, and the floor of which is formed by flat longitudinal surfaces 5, diverging upwardly to form an angle of approximately ninety degrees, so that stocks of different cross sectional formations and dimensions can be placed in said two alined troughs and will engage the surfaces 5, thereof, and will be accurately centered thereby. The upper outer corners of each jaw block, at opposite sides of the V socket, or groove, are longitudinally rabbeted to form longitudinal upwardly facing shoulders or seats 6, and the exterior surface 7, of the block below and between the shoulders 6, is approximately semi-cylindrical, being usually accurately turned up by a lathe or other suitable machine.

Sockets or holes 8, are cut transversely through the top edge portions of the base side walls to longitudinally receive and accurately aline said jaw blocks. These sockets can be accurately and economically cut by a suitable boring machine to aline the sockets and form therewith semi-cylindrical surfaces concentric with and snugly and longitudinally receiving the curved surfaces of the jaw blocks. These sockets are preferably of such depth that the horizontal shoulders 6, of the blocks will be approximately flush with the adjacent top edges of the base side walls receiving the blocks. The blocks can then be clamped and held in said sockets by clamping plates 40, resting on said top edges of the walls and lapping over onto said seats 6, of the blocks and removably secured by vertical bolts 9, passing down through said plates and into the walls. The blocks can project laterally from the base walls and toward the saw blade, and are longitudinally adjustable and yet will be rigidly held by the socket walls and the clamping plates, after adjustment. This construction is exceedingly strong and durable and the jaw blocks can be economically made and easily and accurately assembled in the alined bored holes in the base walls.

The two movable jaws or clamping levers 10, are arranged above the jaw blocks, one lever being provided for each block, and each lever is preferably arranged directly above and in the same vertical plane as the side wall receiving its jaw block. Each lever 10, is preferably of heavy construction and formed between its ends with a mortise or passage extending vertically therethrough from top edge to bottom edge to loosely receive a strong rigid vertical block, chair, or pillar 11, bolted to and rising from the adjacent base side wall and on which the lever is rockable and to which the lever is pivoted by heavy transverse pivot pin 12, forming the fulcrum on which the lever rocks vertically.

The lever supporting blocks and fulcrums are so arranged that the short front free ends of the levers overhang the jaw blocks while the long rear ends of the levers extend and overhang the rear end of the machine base. The said short free ends of the levers are preferably formed with vertical tapped holes extending therethrough directly above the longitudinal centers of the V grooves or troughs of the jaw blocks. Vertically adjustable longitudinally threaded heavy pins or bolts 13, are arranged in and project above and below said holes, and the lower projecting ends of these bolts are provided with dogging points to constitute the stock biting or engaging portions of the clamping levers. These bolts 13, can be vertically adjusted in the levers to attain the desired adjustment according to the cross sectional shape or dimensions of each piece of stock being operated on, and to pinch the stock as may be desired in any particular instance. The rear end portion of each clamping lever is formed with a mortise or passage 15, extending vertically therethrough and loosely receiving a vertical link, pitman or push rod in the form of a rotatable adjusting screw 16. The mortise is formed to permit rocking of either the lever or the screw with respect to the other and the screw is adjustably and pivotally coupled to the lever by a rockable nut 17, extending transversely through the lever end and the mortise therein and rotatably mounted in the lever end. The bore of this nut extends vertically (diametrically) therethrough and the screw extends through and is longitudinally adjustable in said bore. Each clamping lever is provided with an adjusting and operating screw 16, and the two screws 16, depend from their levers at the rear of the machine base, and at their usually rounded nonthreaded lower ends 18, said screws abut loosely against the floors of vertical sockets 19, formed in the top edges of the free ends of vertically-swingable clamping-lever-operating cam or wedge levers 20. These two levers 20, are usually parallel horizontally-arranged and spaced a distance apart and at their rear ends are pivotally coupled by transverse pivot or fulcrum pins 21, to rigid arms 22, integral with and projecting upwardly from horizontally-arranged power-cylinders 23, fixed on strong brackets 24, projecting from and rigidly secured to a depressed end portion of the machine base. The upper side of the front portion of each bracket 24, overlying the part of the base on which it rests, is formed with a pair of spaced parallel tracks 25, and an intervening depression. These tracks are parallel with the longitudinal axis of the cylinder of said bracket and are located under the free end of the lever 20, coupled to said cylinder.

Each cylinder contains a reciprocating piston, and each piston is provided with a piston-rod 26, extending forwardly from its cylinder and below the adjacent lever 20, and over its bracket 24 and approximately in line with the depression between the two tracks 25 of its bracket. At its front end, each piston rod is provided with and rigidly secured to a cross-head, slide or wedging block 27, which is operated by the piston rod and piston to wedge up and control the vertical position of the lever 20, immediately thereover. Each slide block is longitudinally and vertically slotted or forked to slidably receive, and serve as a guide for, the lower longitudinal edge of the free end of the adjacent lever 20, and also to receive a roll 28, mounted to revolve on a transverse axis 30, carried by the block. Each block is formed with a pair of bottom edges 31, resting and longitudinally slidable on the adjacent pair of tracks 25, while the roll 28 depends between said tracks.

The uppermost portion of the circumference of the roll bears against the longitudinal lower edge 33, of the adjacent lever 20, which depends into and guides said block and this edge 33 is longitudinally inclined downwardly and forwardly to provide a cam or wedge-like formation in connection with the fixed horizontal tracks 25. The arrangement is such that when the pistons move in toward the closed ends of their cylinders and the slide blocks move toward the fulcrumed ends of levers 20, the levers 20, will move down by gravity as the rolls 28, move rearwardly along the upwardly and rearwardly inclined edges 33, thereby permitting the long ends of the clamping levers to drop to elevate the stock engaging ends thereof, but when the power fluid is turned into the cylinders behind the pistons, and the pistons are forced outwardly, the slide blocks 27, will be driven forwardly on their tracks 25, and the slide block rolls 28, will move toward the front free ends of the levers 20, along the inclined edges 33, and thereby exercise great power in elevating the free ends of said levers, and the long or rear ends of the clamping levers through the medium of the screw push rods 16, thereby depressing the front or clamping ends of said clamping levers to grip the stock against the jaw blocks under the desired pressure. The slide blocks will thus hold the clamping levers in position tightly gripping the stock during the stock cutting operation or until fluid pressure is again turned into the cylinders to throw the pistons back and thereby withdraw the slide blocks.

The lower end portions of the screw rods 16, are preferably provided with hand wheels 35, rigid therewith and by which the rods can be rotated by hand when the clamping levers are not gripping the stock, to adjust the positions of the clamping levers with respect to the cam or actuating levers and consequently the ends of the levers with respect to the jaw blocks. These screw rods can be thus adjusted to vary or control the clamping pressure of the clamping levers on the stock, and to elevate or depress the region of vertical movement of the clamping end of each lever to accord to the cross sectional dimensions of the stock being operated on in each instance, and to take up wear although rod 16, need not always be threaded and adjustable. The stock biting or dogging screws carried by the clamping ends of the levers provide for an additional or possibly more refined adjustment, in this connection.

The cylinders can be supplied with any suitable connections and valves for controlling the power fluid for moving the pistons. Any suitable fluid, such as compressed air, water or steam can be employed in the cylinders at any desirable pressure.

The arrangement of wedging cross head and levers, is such that the pressure on the piston can be enormously multiplied at the point of application to the stock, and the stock can be quickly clamped and released so that a minimum amount of time is required in clamping and releasing stock. The clamp can be almost instantaneously applied or released.

Where clamping levers are employed at both sides of the saw blades with their independent operating means, the cylinders are usually simultaneously operated to simultaneously apply and release both clamps, but my invention is not so limited as either lever can be operated without the other, and in fact, my invention is not limited to the use of two clamping levers. In fact, many machines are equipped with only one clamping lever arranged at the front side of the saw blade and with one set of operating devices therefor.

Furthermore, my present invention is not limited to use in connection with cutting off machines of the internal or center opening saw type, nor in fact to use on cutting off machines, but is adapted for use wherever a powerful clamp is required for holding stock or other work that is capable of frequent and quick and easy release and application.

In the particular example illustrated, the clamping plates 40, at the rear side of the fixed jaw blocks are held down by or form parts of the upright chairs 11, on which the clamping levers are mounted, and the clamping or securing bolts 9', for these particular clamps 40, and the chairs 11, rising therefrom are greatly elongated and extend upwardly through the clamps and chairs and are provided with nuts 9$^a$, screwing down on the upper ends of the chairs, and also extend downwardly through rigid parts of the base side walls and are provided at their lower ends with securing nuts 9$^b$, screwing up tightly against the lower faces of parts of said walls and the walls are formed with transverse side openings 9$^c$, through which said nuts 9$^b$, are accessible for tightening or adjustment.

Exceedingly strong and rigid anchoring and securing arrangements are thus provided for the chairs 11, to withstand the great upward pull of the clamping levers when in action on said chairs.

It is evident that various changes, modifications and variations might be resorted to without departing from the spirit and scope of the invention and hence I do not wish to limit myself to the disclosure hereof.

What I claim is:

1. In stock clamping mechanism, in combination, a base having a straight socket extending transversely therethrough and longitudinally open along its upper side at an edge of said base, said socket being approximately semi-cylindrical throughout its length, a jaw block extending longitudinally through and fitted in and conforming to the curvature of said socket and forming a longitudinal V-trough exposed at said edge of the base, and clamping means arranged above said block for locking the stock in and extending longitudinally through said trough.

2. In stock clamping mechanism for cutting off and other machines, a base having alined holes extending transversely through edge portions of opposite walls and forming approximately semi-cylindrical sockets through said edges, alined jaw blocks forming longitudinal stock receiving troughs and having exterior surfaces conforming to and fitting in said holes, and clamping means secured to said base wall edges and overlapping said blocks.

3. A wall having an approximately semi-cylindrical hole bored transversely through its top edge portion and open along its top side through said edge, in combination with a jaw block at its upper side having a longitudinal stock receiving and centering trough and faces at opposite sides of the trough to receive clamping plates, the exterior of said block below said upper side being turned to approximately semi-cylindrical form to fit said socket, and securing members lapping over said faces.

4. In a cutting off machine, in combination, a base having an upwardly extending portion, a cutting off saw beside said portion, an approximately semi-cylindrical jaw block set down in and extending transversely through said portion and having its upper side exposed and forming a longitudinal trough to longitudinally receive the stock operated on by said saw, said portion formed with an approximately semi-cylindrical socket extending transversely therethrough and longitudinally receiving said block, means securing said block against rotating and sliding in said socket, and clamping means arranged above said block to lock the stock in said trough.

5. In stock clamping mechanism for cutting off and other machines, in combination, a support provided with a stationary jaw forming a longitudinal stock receiving V-trough open at the top and ends, a vertically-swingable clamping lever carried by said support and having its clamping end arranged over and transversely with respect to said trough to clamp the stock down therein, and operating means applied to the opposite end of said lever.

6. In combination, a base having an approximately semi-cylindrical socket longitudinally open along one side at a face of the base, an approximately semi-cylindrical jaw block arranged longitudinally in and conforming to said socket and having a longitudinal stock receiving side exposed at said face of the base, clamping plates on the base and engaging said block to hold the same against rotation in said socket, and stock clamping means arranged opposite said exposed face of the block and adapted to clamp the stock thereagainst.

7. Stock clamping mechanism comprising a clamping lever, an actuating lever, a cylinder and its piston and rod, a cross head actuated by said rod for controlling said actuating lever, and a push rod between the free end of the actuating lever and the clamping lever for swinging said lever on its clamping movement.

8. Stock clamping mechanism comprising a piston actuated sliding cross head, a vertically movable actuating lever resting thereon and swung upwardly thereby on its actuating stroke, a vertically swingable clamping lever having a clamping end and an elongated opposite end, and a push rod connection between said elongated end and said actuating lever.

9. Stock clamping mechanism comprising a vertically swingable clamping lever, a vertically swingable actuating lever, a push rod connection from said actuating lever to said clamping lever, and a power cylinder actuated wedging device for swinging said actuating lever on its operative stroke.

10. Stock clamping mechanism comprising a support, a clamping lever, a track, a power cylinder operated cross head movable on said track, a cam lever engaging said cross head and swung thereby on its operative stroke, and operating connections from said cam lever to said clamping lever.

11. Stock clamping mechanism comprising a movable clamping member, a support provided with a track, a cylinder fixed to said support and provided with a piston and piston rod, a cross head on said track and reciprocated by said piston rod, a lever at one end fulcrumed to said cylinder and at its free end having a longitudinally inclined edge engaging said cross head, and operating connections from said lever to said member.

12. In combination, a base having a rigid chair rising therefrom, a clamping lever rockable on and fulcrumed to said chair, said base having a fixed jaw arranged under the clamping end of said lever, an actuating lever, a push rod from the actuating lever to the end of the clamping lever opposite said clamping end, and a power cylinder actuated wedging device for swinging said actuating lever on its clamping lever actuating stroke.

13. In combination, a base having a fixed stock receiving jaw at its top edge, a chair rising from said edge to one side of said jaw, means rigidly securing said chair to said base, a vertically-swingable clamping lever fulcrumed on said chair and having a mortise extending vertically therethrough and loosely receiving said chair, said lever having a clamping end arranged above and transversely with respect to said jaw, and lever operating means applied to the opposite end thereof.

14. In combination, a support, a clamping lever having a clamping end and at its opposite end being transversely mortised and provided with a rockable nut, the bore of the nut registering with said mortise, a rotary screw threaded rod passing loosely through said mortise and through and adjustable in said bore, an abutment engaging the opposite end of said rod, said rod provided with a hand wheel for rotating the same to adjust the lever, an actuating lever provided with said abutment, and a power cylinder operated wedging head engaging and operating said actuating lever.

15. In combination, a support, a clamping lever, an actuating lever for the clamping lever having a socket, a rod pivotally joined to the clamping lever and having an end seated in said socket, and power cylinder actuated wedging means for swinging said actuating lever on its clamping lever operating stroke.

16. In combination, a movable clamping member, a support having a track, a cross head movable on said track and provided with a roll rotatable on an axis arranged at right angles to the direction of movement of the cross head on the track, power cylinder actuated means for reciprocating said cross head, and a lever operatively connected to move said clamping member and actuated and controlled by said cross head and having a longitudinally inclined portion bearing against said roll.

17. In combination, a base having a stock receiving jaw, a chair rising from the base to one side of said jaw, a vertically swingable clamping lever fulcrumed on said chair and having a clamping end overhanging said jaw and provided with stock engaging and clamping means, lever operating means applied to the opposite end of said lever for depressing its clamping end to perform the clamping operation, said base provided with an elongated vertical passage therethrough to an accessible transverse abutment, and an elongated clamping bolt for said chair and arranged in said passage and having holding means engaging said abutment.

18. In combination, in clamping mechanism, a base, a clamping lever fulcrumed between its ends to provide a clamping end and an elongated end, a transverse block mounted to rock in the elongated end, a push rod depending from and rockable with said block, a vertically swingable actuating lever at its free end operatively engaged by the lower end of said rod, and power cylinder operated means arranged below and upholding said actuating lever and movable to operate said lever and determine the vertical position thereof.

19. In combination, an inclined vertically movable free end actuating lever, a power cylinder actuated wedging head engaging the lower edge of and upholding said lever and movable longitudinally thereof to operate and determine the vertical position thereof, a clamping lever, and an operating connection between the free end of the actuating lever and one end of said clamping lever, substantially as described.

20. In combination, a clamping lever fulcrumed to provide a heavy end and a clamping portion, an actuating lever, a push rod operating connection from the actuating lever to the heavy end of the clamping lever whereby the actuating lever approximately sustains the heavy end of the clamping lever, and power cylinder actuated operating means for and approximately sustaining the actuating lever and determining the vertical position thereof to apply and release the clamp and to maintain the clamp applied.

21. In combination, a vertically swinging actuating lever, a head arranged thereunder and movable longitudinally thereof, the lower edge of said lever resting on said head, said lever and head coöperating with a wedging action to operate the lever, the vertical position of said lever being determined and sustained by the position of said head longitudinally of the lever, a clamping lever, and an operative connection from the clamping lever to the actuating lever, substantially as described.

22. In combination, a clamping lever having a clamping end and an elongated end, a swingable actuating lever, a direct operative connection between the elongated and free ends of said levers, said actuating lever having a longitudinally arranged wedging lower edge, a lever operating head on which said edge rests, said head being movable longitudinally of said lever to operate the same on its clamping lever actuating stroke and to maintain said levers in clamping position, operating means for said head, and adjustable means for accommodating stock of different dimensions.

23. In combination, a jaw to receive the stock, a clamping lever having a stock engaging portion over said jaw and a rearwardly extending heavy free end, an actuating lever having its free end arranged below said rear end of the clamping lever, a push rod pivotally connecting the free end of the actuating lever and the rear end of the clamping lever, whereby the actuating lever approximately sustains the weight of the rear end of the clamping lever and whereby upward movement of the actuating lever rocks the clamping lever on its clamping stroke, and actuating lever operating means determining the vertical position of said lever, said means being constructed and arranged to swing said lever on its operative stroke and to lock the same holding the clamping lever in clamping position.

24. In combination, a stock receiving jaw, a clamping lever having a stock engaging member arranged opposite said jaw, an actuating lever operatively connected with said clamping lever to move the same on its clamping stroke and to maintain the same in clamping adjustment, and quick-action power cylinder operated means for operating said actuating lever and for locking the same in position holding said clamping lever in clamping adjustment.

25. In combination, a stock receiving jaw, a clamping lever arranged to clamp the stock to said jaw, an actuating lever operatively connected with said clamping lever to swing the same on its operative stroke and to maintain the same in clamping position, and a power-cylinder-actuated actuating-lever-operating reciprocating head on which said actuating lever rests, said lever and head relatively arranged and constructed to lock the clamping lever in clamping adjustment, substantially as described.

In testimony whereof I affix my signature in the presence of two witnesses.

GEORGE GORTON.

Witnesses:
  G. E. GUSTAFSON,
  P. M. HENKES.

Copies of this patent may be obtained for five cents each, by addressing the "Commissioner of Patents, Washington, D. C."